United States Patent [19]

Simpson

[11] 4,329,823
[45] May 18, 1982

[54] SUPPORT SPACER APPARATUS

[75] Inventor: Harold G. Simpson, Oklahoma City, Okla.

[73] Assignee: Encon Products, Inc., Oklahoma City, Okla.

[21] Appl. No.: 93,173

[22] Filed: Nov. 13, 1979

[51] Int. Cl.³ .............................................. E04B 2/00
[52] U.S. Cl. ...................................... 52/407; 52/410; 52/478; 52/508
[58] Field of Search ................. 52/508, 409, 410, 404, 52/269, 478, 543, 408, 407, 506, 480, 698; 85/1 T, 1 P

[56] References Cited

U.S. PATENT DOCUMENTS

| | | | |
|---|---|---|---|
| 2,256,961 | 9/1941 | Pearson et al. | 20/4 |
| 2,590,687 | 3/1952 | Crafton . | |
| 2,993,110 | 7/1961 | Godley | 52/508 X |
| 2,999,571 | 9/1961 | Huber | 52/508 X |
| 3,019,864 | 2/1962 | Lester | 52/407 |
| 3,031,044 | 4/1962 | Stitt . | |
| 3,054,482 | 9/1962 | Lassen | 52/508 X |
| 3,055,147 | 9/1962 | Goodwin . | |
| 3,210,896 | 10/1965 | Detman | 52/478 X |
| 3,394,516 | 7/1968 | Taylor et al. | 52/410 |
| 3,471,183 | 10/1969 | Fischer | 52/508 X |
| 3,474,583 | 10/1969 | Manias | 52/408 X |
| 3,803,791 | 4/1974 | Turnbull et al. | 52/506 |
| 3,900,995 | 8/1975 | Ehrenberg | 52/480 X |
| 4,081,938 | 4/1978 | Bertacchi et al. | 52/410 |
| 4,102,103 | 7/1978 | Marcmann | 52/406 |
| 4,114,338 | 9/1978 | Beck | 52/478 |
| 4,250,678 | 2/1981 | Skuran | 52/478 |

FOREIGN PATENT DOCUMENTS

| | | | |
|---|---|---|---|
| 998266 | 10/1976 | Canada | 85/1 P |
| 2514259 | 10/1976 | Fed. Rep. of Germany . | |
| 2617911 | 9/1977 | Fed. Rep. of Germany . | |
| 885722 | 12/1961 | United Kingdom . | |

OTHER PUBLICATIONS

Product Brochure, Corbesco, Inc.

Primary Examiner—Price C. Faw, Jr.
Assistant Examiner—Carl D. Friedman
Attorney, Agent, or Firm—Bill D. McCarthy

[57] ABSTRACT

A support spacer apparatus relating to a paneling system for providing improved insulating qualities to pre-engineered buildings and the like in which stresses imparted to a supported structure are transferred through compressible insulation without diminishing the thermal character of the insulation, the support spacer apparatus comprising a spacer member having a plurality of fastener assemblies connected thereto and extendable through the insulation; the fastener assemblies attachable to an underlaying substrate by the application of energy to the fastener assemblies for supporting the spacer member at a predetermined distance from the substrate such that the insulation is disposed substantially in its prepenetration state after attachment of the fastener assemblies to the substrate.

43 Claims, 12 Drawing Figures

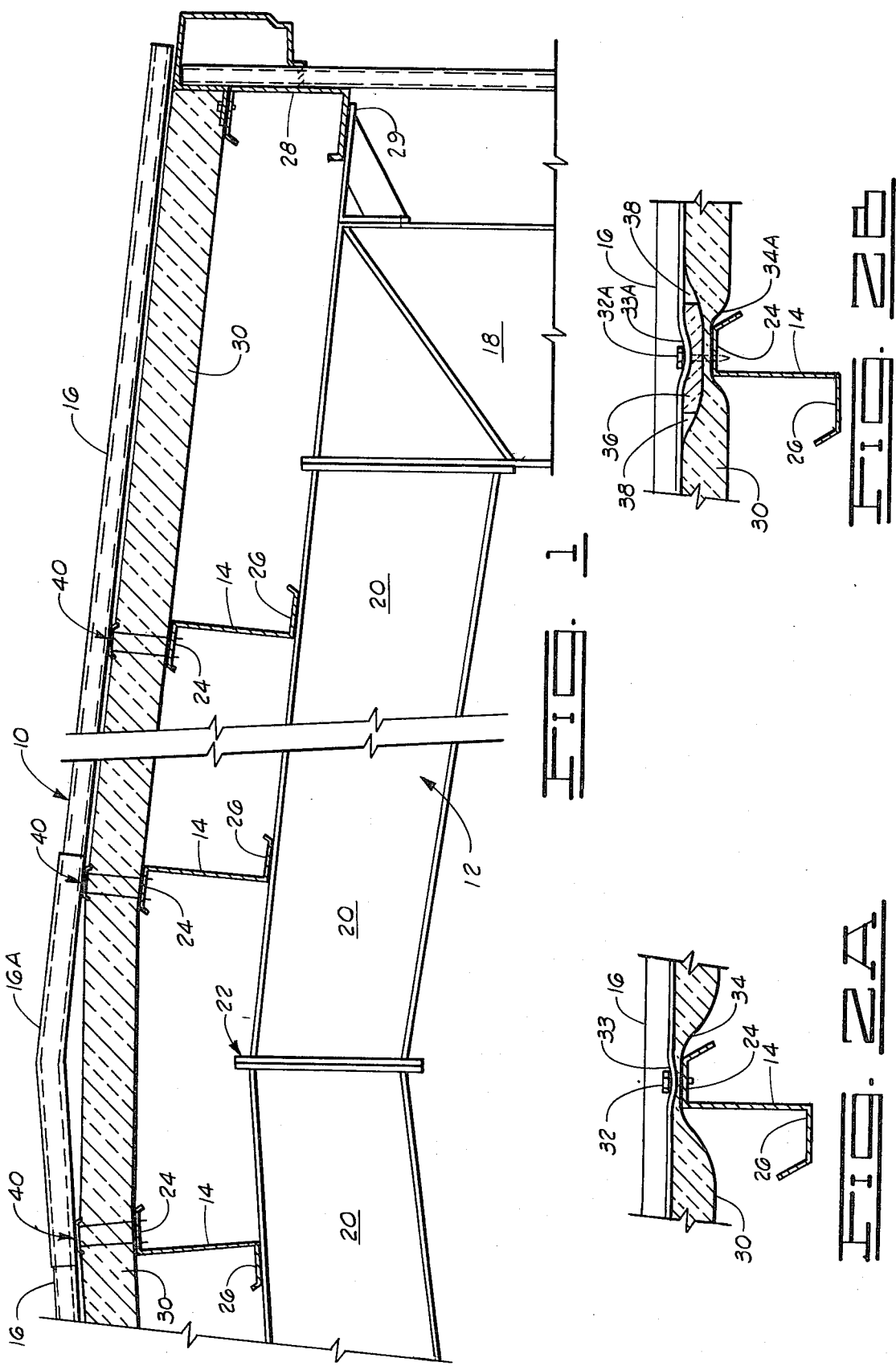

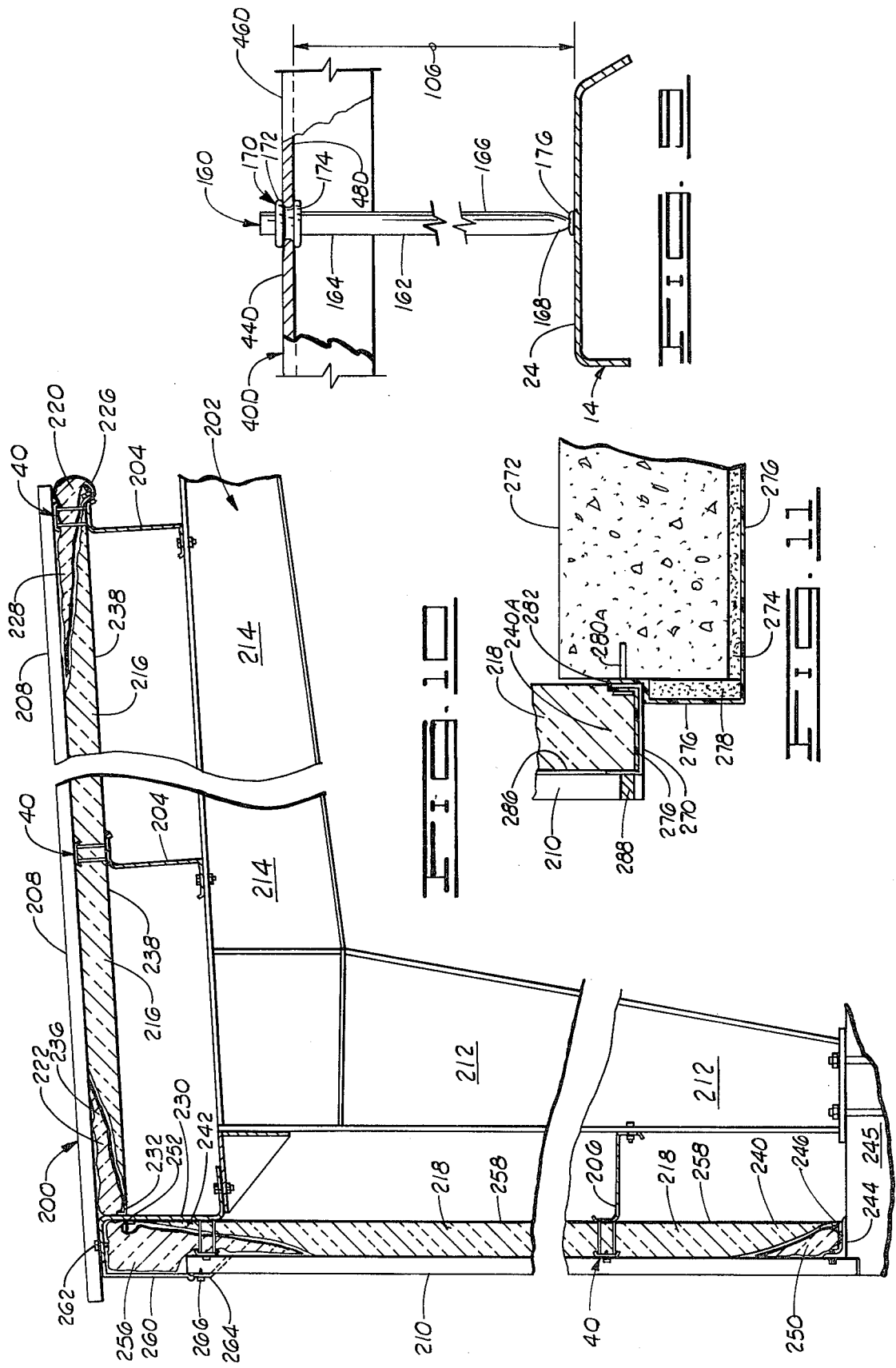

SUPPORT SPACER APPARATUS

BACKGROUND OF THE INVENTION

1. Field of the Invention

The present invention relates generally to the field of improving the heat transfer resistance of a paneling system in which insulation material is confined between construction members, and more particularly, but not by way of limitation, to a paneling system providing improved insulating qualities to pre-engineered buildings and the like.

2. Discussion of the Prior Art

The pre-engineered building industry has developed into a multi-billion dollar segment of the building construction industry in the United States, and it has experienced an increasingly greater share of the construction industry budget throughout the world. The established method of erecting the roof or wall of a pre-engineered building is to erect the primary structural members; attach the secondary structural members to the primary structural members; secure the appropriate bracing members; roll blanket-type insulation across the secondary structural members; dispose panel members over the insulation; and connect the panel members and secondary structural members together by fasteners that penetrate the insulation. The securement of a panel member to a secondary structural member is performed by a workman who stands on top of the panel member and inserts fasteners through the panel member to attach it to the underlying secondary structural member.

The insulation of a pre-engineered building in the above described manner presents a major problem in the construction of such buildings. As the fasteners are installed through the panel members, the underlaying insulation is compressed between the panel members and the secondary structural members as the fasteners are attached to the secondary structural members. This is undesirable, as it reduces the thermal effectiveness of the insulation. Furthermore, the purpose of the fasteners is to secure the panel members and to transfer stress from the panel members, which is usually the exterior sheathing or roofing members, to the secondary structural members. This transferred stress may be tension, shear or compressive stress. As to the latter, compressive stress is created by downwardly directed live loads which are transferred through the insulation, which is generally a compressible but non-elastic material. As the panel members move relative to the secondary structural members during the life of the building, looseness occurs around the fasteners, and it is difficult, if not impossible, to maintain a water tight connection at the points where the fasteners penetrate the panel members.

One solution that has been offered to the problem of compressed insulation is the provision of a more elastic insulation board disposed between the insulation and the panel member. This insulation board is located such that the fasteners are caused to penetrate the insulation board before penetrating the insulation, and as the fasteners are attached to the underlaying secondary structural members, the insulation board spreads the compressive load of the fasteners over a larger area of the insulation and reduces the amount of compressive reduction of the thickness of the insulation. While this is an improvement over the previously described method, it still has a number of shortcomings. Among these is the fact that the insulation is still compressed under the insulation boards between the insulation board and the insulation. The insulation board is normally made of a soft material, and the compressive force caused by inserting the fasteners may tend to crush the insulation block. This in turn results in a number of detrimental features. These include dimpling of the single skin panel members, ponding of water in these dimples around the fastener heads and resulting excessive corrosion at these points. Continued working of the roof because of expansion and contraction can cause continued compression of the insulation board at the fastener points, and this can result in roof leaks between the heads of the fasteners and the panel members. This occurs because the pressure between the fastener heads and the panel members is no longer maintained, and even the provision of washer members will not guarantee a water tight seal.

Other problems with the use of the insulation boards include void spaces which are created between the panel members and the insulation at the edges of the insulation boards; these void spaces are detrimental from a heat transfer standpoint, and the installation of panel members with the insulation boards has been a problem from an erection standpoint. The insulation boards are relatively expensive and are difficult to install. Wind, which is often encountered, frequently dislodges the insulation boards before the overlaying panel members can be positioned, or the insulation boards are dislodged by the panel members as the panel members are being positioned.

The pre-engineered building industry has adopted the use of "diaphragm action" to resist wind loads on a building. Diaphragm action requires that force parallel to the plane of the roof panel be transferred through the fastening system to the underlaying secondary structural members. While the use of insulation boards has helped somewhat in regard to increasing the thermal effectiveness of the insulation, it remains that the diaphragm action on the panel members causes the stress to be transferred through the insulation, and the problem of maintaining water tight seals around the fasteners continues even with the use of such insulation boards, as such insulation boards do not entirely prevent initial and continuing compression of the insulation underlaying the panel members.

The patent issued to Taylor, U.S. Pat. No. 3,394,516, taught the use of a spacer between the panel members and the secondary structural members to prevent the panel members from being pulled so close to the secondary structural members as to crush or compress the insulation. The Taylor spacer has a plurality of pointed legs that served to penetrate the insulation, and sheet metal screws served to secure the panel members to the secondary structural members through the spacer. However, while the Taylor spacer substantially reduced the amount of compressive reduction of the insulation, the pointed legs of the Taylor spacer afforded a heat conducting bridge between the secondary structural members and the panel members. While the Taylor spacer does provide a mechanism for transferring the stress between the panel members and the supporting secondary structural members, the spacer legs of the Taylor spacer, being independent to the fasteners, could move to some degree relative to the secondary structural members, thus permitting some fretting of the fasteners with the panel members. This movement could eventually lead to a deterioration of both the water tightness of the fasteners and the thermal barrier as the insulation next to the pointed legs is spread about. Also, depending upon the type of seal provided with the insulation, penetration of the insulation by the Taylor spacer may in many instances prove difficult to effect without substantially compressing the insulation material while piercing the insulation seal, such as when a vinyl seal is provided. Finally, installation of the Taylor spacer required the placement of appropriately disposed holes in the secondary structural members for receiving the screw members which served to secure the spacer. To a workman located above the spacer, with the secondary structural members hidden from view by the insulation blanket, the only possible way to insert the screw members was to drill the holes from above the spacer and to insert the screw members in the holes while holding the spacer in the same location so as not to lose orientation with the newly drilled holes. This is often difficult to achieve on a windswept roof.

SUMMARY OF THE INVENTION

The present invention provides a support spacer apparatus for supporting a structure at a predetermined distance from a substrate, thus providing a system in which stresses imparted to the structure are transferred through compressible material without compromising the thermal characteristics of the compressible material, and in which the integrity of the structure is substantially unaffected from such transfer of stress.

The support spacer apparatus of the present invention comprises a spacer member having a support surface and a plurality of fastener apertures; a plurality of fastener assemblies are provided, each such fastener assembly comprising a fastener member having a first end and a second end, the fastener member extendable through one of the fastener apertures and the second end attachable to the substrate by applying energy to the first end of the fastener member, with the dimension of the fastener member being determined so that the first end is caused to exert a restraining force against the support surface of the spacer member in an attached position of the spacer member with the substrate. Each fastener assembly also comprises a stay member which provides, in the assembled position, a countering force to the restraining force against the spacer member so that the support surface of the spacer member is spatially disposed at the predetermined distance from the substrate.

In one embodiment of the present invention, column members having channelways passing therethrough serve to function as the stay members, and the fastener members extend through the channelways of the column members. The fastener members are headed screw members having self-drilling/self-tapping screw second ends which are attachable to the substrate via rotary energy applied to the headed first ends of the fastener members. The fastener members cooperate with the column members to penetrate compressible material while such material substantially retains its prepenetration characteristics.

Accordingly, an object of the present invention is to provide an improved support spacer apparatus for supporting a structure at a predetermined distance from a substrate.

Another object of the present invention is to provide an improved spacer apparatus that achieves the above stated object while being capable of penetrating a compressible material without substantially compromising the thermal effectiveness of the compressible material.

Another object of the present invention is to provide an improved support spacer apparatus that achieves the above stated objects while maintaining the integrity of the supported structural member.

Another object of the present invention is to provide an improved support spacer member that achieves the above stated objects and which is capable of transferring stresses through compressible materials without compromising the thermal effectiveness of the compressible material and while maintaining the integrity of the supported structural member.

Another object of the present invention is to provide an improved support spacer apparatus that achieves the above stated objects and which offers manufacturing economy, ease of installation and long service life with a minimum of upkeep.

Other objects, features and advantages of the present invention will become apparent from the following detailed description when read in conjunction with the drawings and appended claims.

BRIEF DESCRIPTION OF THE DRAWINGS

FIG. 1 is a semi-detailed, cutaway end view depiction of a pre-engineered building roof constructed in accordance with the present invention.

FIG. 2A depicts a profile of compressed insulation as encountered in a normal prior art installation of a pre-engineered building roof. FIG. 2B depicts a profile of a prior art modification to the installation of FIG. 2A, the modification being the inclusion of an insulation board between the roof panel and the insulation.

FIG. 9 is a side elevational, partial cutaway view of one other fastener assembly constructed in accordance with the present invention.

FIG. 10 is a semi-detailed, cutaway end view depiction of the construction features of a pre-engineered building incorporating the present invention and showing an improved insulation system.

FIG. 11 is a semi-detailed, partial cutaway elevational view showing an alternative insulation system to that depicted in FIG. 10.

DESCRIPTION

Figure 3:
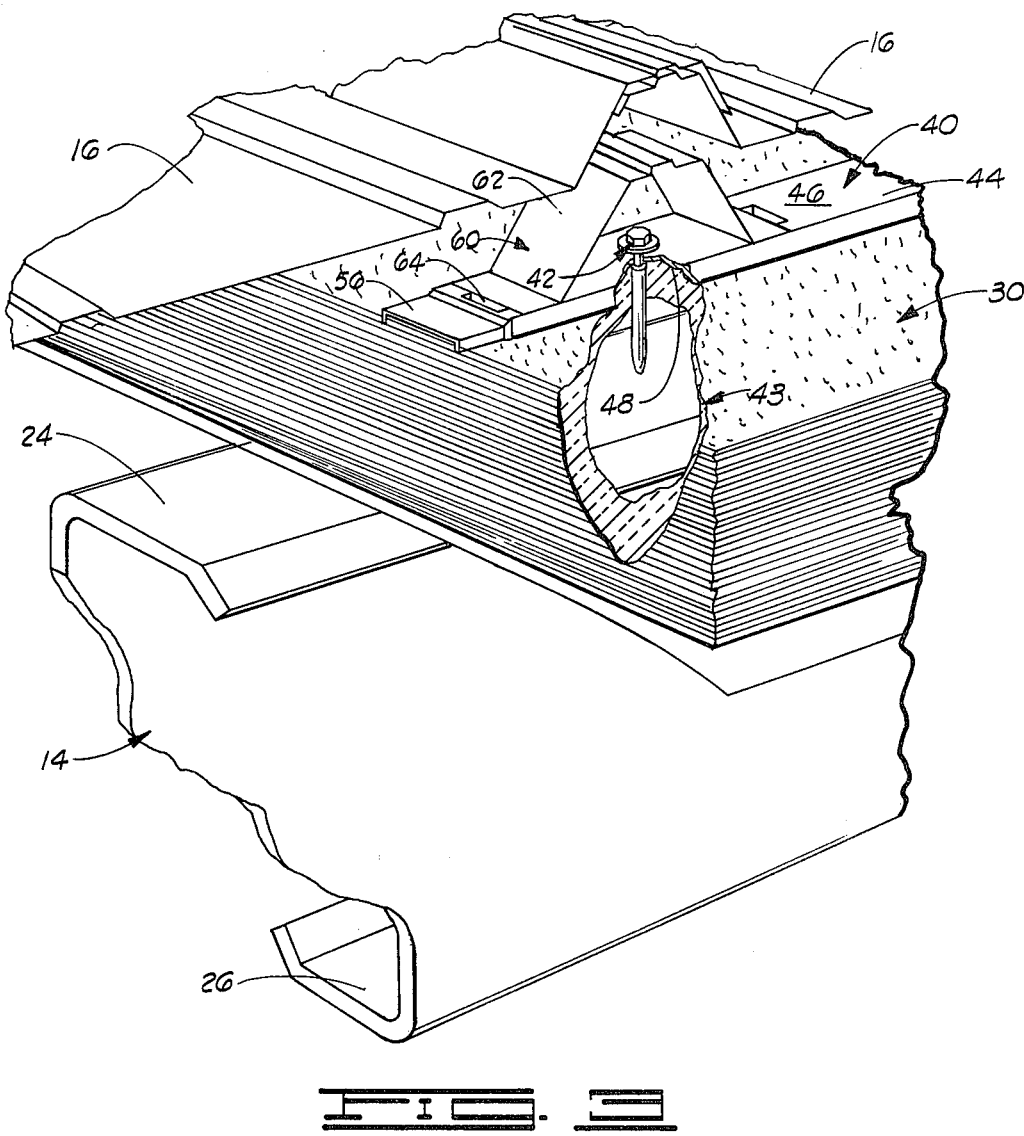
FIG. 3 is a partial cutaway, perspective view of a support spacer apparatus of the present invention showing the relative positions of roof panel members to a secondary structural member of a pre-engineered building.

Referring to the drawings in general, and in particular to FIG. 1, shown therein and designated by the numeral 10 is a portion of the roof of a pre-engineered building constructed in accordance with established methods of erection and as modified by using the support spacer apparatus of the present invention. The pre-engineered building roof 10 comprises, in part, a plurality of primary structural members 12, a plurality of secondary structural members 14, and a plurality of corrugated roof panel members 16. The primary structural members 12 comprise the vertically extending column members 18 and the generally horizontally extending rafter members 20 supported by the column members 18 and interconnecting via conventional bolts (not shown) to form an apex center 22. The secondary structural members 14, sometimes referred to as purlins, are longitudinal members that have oppositely extending flanges 24 and 26, which impart a somewhat Z-shaped profile to the purlins. The roof panel members 16 are fastened indirectly, in the manner described hereinbelow, to the secondary structural members 14 which extend substantially the length of the pre-engineered building roof 10 and which are connected to the rafter members 20 via conventional connectors (not shown). Eave struts 28 are supported along the edge of the building by connecting the eave struts 28 to outwardly extending support members 29 which are connected via conventional connectors (not shown) to the vertical column members 18. Other details of the pre-engineered building depicted in FIG. 1 are either not described or omitted from the drawings in order to simplify the present disclosure.

The established method for insulating a pre-engineered building roof, such as the roof 10 in FIG. 1, is to place rolls of insulated material 30 over the purlins 14 so that the insulation is supported by the flanges 24. The roof panel members 16 are then positioned directly on top of the insulation 30 and bolted to the flanges 24 in the manner shown in FIG. 2A.

In FIG. 2A, a typical prior art connection of the roof panel members 16 to the purlins 14 is shown in which a screw member 32 is extended from the top through the panel member 16 and threadingly engages a predrilled hole in the flange 24 of the underlying purlin 14. As the screw member 32 is tightened, the panel member is deformed, and as depicted in FIG. 2A, a dimple depression 33 results around the headed end of the screw member 32. This securement of the panel member 16 to the purlin 14 results in the constriction of the insulation 30, as shown at 34, reducing the thickness of the insulation and creating a "thermal short circuit" through the roof panel member 16. That is, excessive heat loss occurs through this and the many other prior art joints similarly constructed, and as a result, a large amount of heat energy is lost through the roof even though it has been insulated. This is evident, by way of illustration, when the roof of a pre-engineered building is covered by snow: the first points at which melding occurs coincide with the connecting joints where the screw members 32 attach the roof to the purlins. This problem is then exacerbated by the melted snow that forms pockets of water in the dimpled depressions 33 about the heads of the screw members 32, resulting in excessive leaks, corrosion and other undesirable problems with the building. All of this is the result of fastening the panel members 16 to the purlins 14 by extending the screw members 32 through and compressing the insulation 30; the insulation 30 is normally compressible mineral or chopped glass fiber insulation (such as Fiberglass), and is reduced to less than 15 percent of its original thickness as it is constricted between the purlin 14 and the panel member 16, and since the effectiveness of the insulation is proportional to the thickness of the insulation, the resistance to heat transfer at the points of constriction 34 is substantially eliminated.

As noted above, one prior art solution to this heat loss is the provision of an insulation board 36 such as depicted in FIG. 2B, in which like numerals designate those elements which are identical to those depicted in FIG. 2A. The insulation board 36 is disposed above the flange 24 between the insulation 30 and the roof panel member 16 so that the screw member 32A passes through the insulation board 36, through the insulation 30, and attaches to the flange 24. The insulation board 36 serves to spread the compressive force of the fastened roof panel member 16 at the screw members 32 over a greater area of the insulation 30, and although the insulation 30 is constricted at 34A in the same manner as shown in FIG. 2A, the combined thickness of the insulation board 36 and the compressed insulation at the connecting joints is greater; that is, the effective thickness of the insulation at the constriction 34A in FIG. 2B is greater than the effective thickness of the insulation at the constriction 34A in FIG. 2B.

While the arrangement in FIG. 2B is an improvement of that shown in FIG. 2A, there are a number of shortcomings in using the insulation boards such as that depicted by the insulation board 36. The insulation 30 is still compressed and there are voids 38 between the insulation board 36, the roof panel member 16 and the insulation 30, the result of which is even greater deterioration of the insulating quality at the connecting joints. In practice, the insulation board 36 is normally made of a relatively soft material, and the compressive force caused by the screw member 32A usually tends to crush the insulation board, resulting in increased dimpling of the panel member 16, and ponding of water in the exaggerated dimple depressions 33A brings about even greater corrosion at these points. Continued working of the roof because of expansion and contraction can cause continued crushing of the insulation boards at the connecting joints, leading to even worsened leaking conditions as the pressure between the heads of the screw members 32A and the panel members 16 is no longer maintained, and even elastomeric washers, if provided, do not insure that water tight seals will be maintained during the life of the roof.

These problems, for all practical considerations, are eliminated by the application of the present invention which permits the secure support of a structure at a predetermined distance above a supporting substrate where a compressible material is disposed between the structure and the substrate, the integrity of the compressible material being substantially maintained following securement of the structure to the substrate. For the case at hand, the supported structure is one or more roof panels, and the supporting substrate will be provided by a plurality of purlins as discussed above. The present invention teaches a support spacer apparatus which serves as an insulation bridge between the roof panel members 16 and the underlaying purlins 14.

Returning to FIG. 1, it will be noted that the roof panels 16 are supported by a plurality of support spacer apparatus 40 which are secured to the flanges 24 of the purlins 14. That is, in FIG. 1, the roof panels 16 are not attached directly to the underlaying purlins as required by established prior art practice and as depicted in both FIG. 2A and FIG. 2B. Rather, the roof panel members 16 shown in FIG. 1 are attached to the plural support spacer apparatus 40. Each of the support spacer apparatus 40 is attached to its respective purlin 14 via fasteners that extend through the insulation material 30 in a manner made more clear by reference to FIG. 3.

Shown in FIG. 3 is an enlarged portion of a purlin 14 with a portion of insulation material 30 shown supported on the upper flange 24 thereof. A portion of a support spacer apparatus 40 is shown, along with portions of overlapping roof panel members 16 depicted above the support spacer apparatus 40, which is fastened to the flange 24 of the purlin 14 by a fastener assembly 42. The insulation 30 and the support spacer apparatus 40 is shown partially removed at 43 so as to show the fastener assembly 42 more fully in this view.

The support spacer apparatus 40 comprises a channel shaped spacer member 44 having an upper first support surface 46 and a lower, oppositely disposed second support surface 48. The spacer member 44 has a plurality of fastener apertures 50 communicating through it from the first support surface 46 to the second support surface 48, the fastener apertures 50 being best shown in FIG. 4. The fastener assemblies 42 extend through the fastener apertures 50 to attach to the underlaying substrate or purlin 14 in the manner described more fully hereinbelow. While the locations of the fastener apertures 50 may assume a variety of layout patterns, the offset pattern shown in FIG. 4 is believed to be beneficial in providing stable securement of the support spacer apparatus 40 to the purlin 14; that is, by staggering the locations of the fastener apertures 50 from side-to-side along the length of the spacer member 44, the support spacer apparatus 40, once attached to the purlin 14 via the fastener assemblies 42, will have greater stability to an imposed load.

Figure 4:
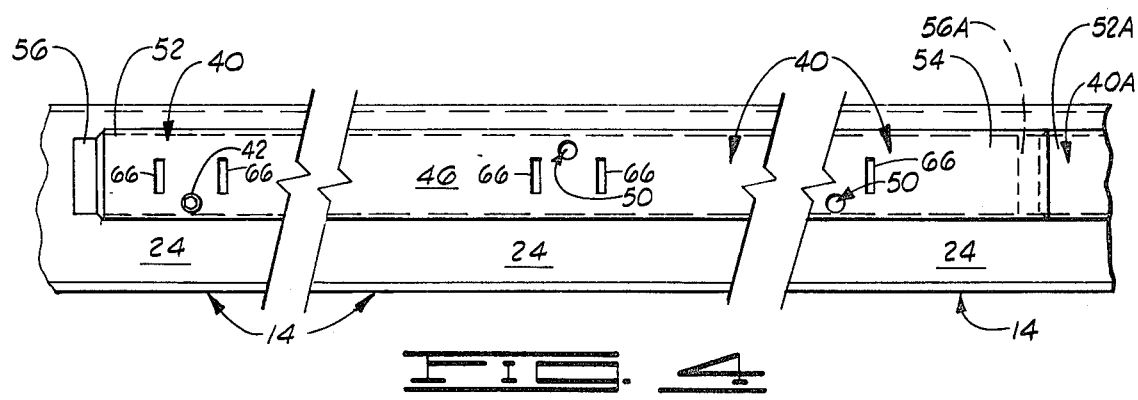
FIG. 4 is a top plan view of the support spacer apparatus of FIG. 3 with the insulation removed to show the secondary structural member beneath the support spacer apparatus.

The support spacer apparatus 40 shown in broken view in FIG. 4 has a first end 52 and a second end 54, a portion of the first end 52 being shaped in the form of a protruding tang 56. Also shown in FIG. 4 is a second support spacer apparatus 40A which is disposed in end-to-end alignment with the support spacer apparatus 40. The support spacer apparatus 40A is identical in construction detail to the support spacer apparatus 40 and is shown having a protruding tang 56A, extensive from a first end 52A thereof, received in the channel web of the support spacer apparatus 40 at the second end 54. In like manner, the protruding tang 56 of the support spacer apparatus 40 is receivable in another support spacer apparatus (not shown) which will be dispose in end-to-end alignment therewith such that a plurality of support spacer apparatuses interjoin to provide a continuously extending upper or first surface 46 along the length of the supporting purlin 14. This interjoining feature serves to provide stability of the support spacer apparatuses 40 supported by a single purlin 14, and further, this interlocking feature of the support spacer apparatus 40 serves to provide a guide means to a workman as he interlocks each support spacer apparatus 40 to those already attached to the underlaying purlin during installation.

Returning to FIG. 3, it will be noted that a panel support bridge 60 is provided at the overlapping edges of adjacent roof panels 16. The panel support bridge 60 has a bridge portion 62 which is supported at its opposite ends on the first support surface 46 by attachment of clip extensions, such as clip 64, disposed in appropriately disposed slots 66 (as shown in FIG. 4). The bridge portion 62 is configured to have a profile which will mate with the overlapping edges of the roof panels 16, and the roof panels 16 are attached to the panel support bridge via conventional bolts (not shown) after a sealant is disposed therebetween.

Each support spacer apparatus 40 has a plurality of fastener assemblies 42 which are designed to penetrate the insulation material 30 and connect to the purlin 14. Shown in FIG. 5 is an enlarged view of one of the fastener assemblies 42 in partial cutaway detail and depicted in an assembled position with the spacer member 44 (but prior to attachment to a substrate or purlin 14).

Figure 5:
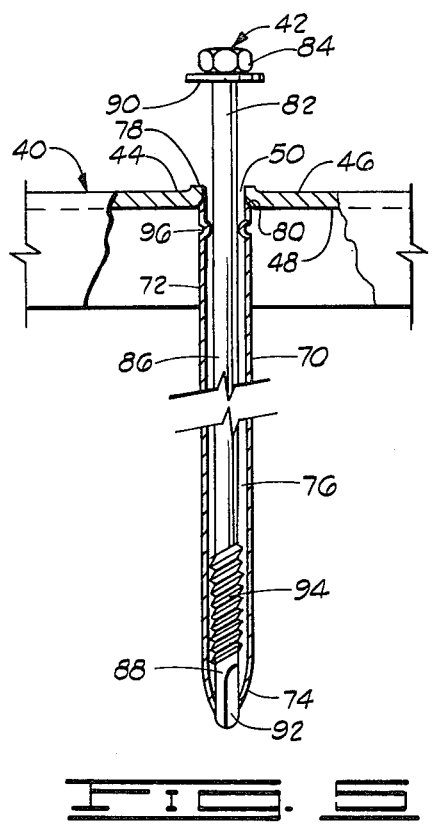
FIG. 5 is a side elevational, partial cutaway view of a fastener assembly constructed in accordance with the present invention.

The fastener assembly 42 depicted in FIG. 5 comprises a column member 70 having a first end 72 and a second end 74, the column member 70 also having a bore or channelway 76 extending from the first end 72 to the distal second end 74. Each of the fastener apertures 50 is tubulated such that the internal surface 78 of the fastener aperture 50 is flared away from the first support surface 46 in the manner shown. This provides a recess 80 to receive the first end 72 of the column member 70, and the first end 72 is wedged or welded in the recess 80. The column member 70, as configured in FIG. 5, is a tube column which is connected to the spacer member 44 at its first or attachment end 72, and which is tapered at its distal second end 74. The channelway 76 is substantially axially aligned and communicates with the fastener apertures 50 with which it is associated.

The fastener assembly 42 also comprises an elongated fastener member 82 which was a first end 84, a body portion 86 and a second end 88. The first end 84 has a bolthead configuration and is optionally provided with a washer 90. The second end 88 serves as a self-drilling-/self-tapping screw and comprises a drill bit end 92, the body portion 86 having a threaded portion 94 disposed in near proximity to the drill bit end 92.

As depicted in FIG. 5, the fastener member 82 is disposed with its body portion extending through the fastener aperture 50 and the channelway 76. The tapered second end of the tube column 70 partially closes the channelway 76 sufficiently to receive the drill bit end 92 in a friction fit therewith, permitting the distal second end 88 to partially protrude from the end of the channelway 76. This arrangement provides for the retention of the fastener member 82 in an assembled position with the tube column 70 in a ready profile for penetration of the insulation material 36 and for securement to the purlin 14.

If desired, the column member 70 can be provided with internal pressure points to assist in retaining the fastener member 82 in the assembled position, such as is provided by the crimped portion 96 in the column member 70. Once the body portion 86 is positioned in the assembled position depicted in FIG. 5, the column member 70 is crimped at some convenient position clear of the threaded portion 94. Of course, other methods of securing the fastener member 82 within the column member 70 may be practiced, with the object thereof being the securement of the fastener assembly 42 to the beam of the spacer member 44 so that the fastener assembly is maintained in the depicted assembled position until attached to a purlin or other underlaying structural member.

Figure 6:
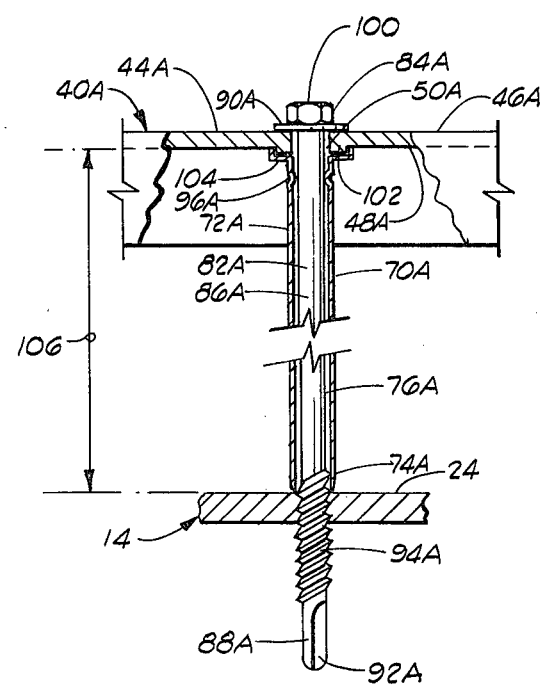
FIG. 6 is a side elevational, partial cutaway view of another fastener assembly constructed in accordance with the present invention.

FIG. 6 shows an alternative fastener assembly 100 which is very similar to the fastener assembly 42 shown in FIG. 5, the fastener assembly 100 shown in an attached position with a purlin in FIG. 6. The numeral designations in FIG. 6 having a suffix "A" indicate similar or identical components to those described for the fastener assembly 42. That is, the fastener assembly 100 comprises a column member 70A having a first end 72A, a second end 74A, and a channelway 76A. The fastener assembly 100 is shown assembled to a modified support spacer apparatus 40A which has a plurality of fastener apertures 50, each of which is identical to the fastener aperture 50A shown in FIG. 5 and each of which has a peripheral ridge 102 extending from the second support surface 48A. The tip 104 of the first end 72A is flared and dimensioned to receive the ridge 102 therewithin, and the column member 70A is secured to the spacer member 44A in any convenient manner, such as by welding or by a friction fit of the ridge 102 and the flared tip 104.

The fastener assembly 100 also comprises an elongated fastener member 82A which is identical to the previously described fastener member 82 and need not be described further herein. As noted, the fastener assembly 100 is shown in its attached position, meaning that the fastener assembly 100 has been actuated to interconnect the support spacer apparatus 40A and the purlin 14 in the manner shown in FIG. 6. That is, the fastener member 82A is shown after it has drilled a hole by forcefully rotating its first or headed end 84A with an appropriately sized wrench while the drill bit end 92A is engaged with the flange 24 of the purlin 14. Once the drill bit end 92A has drilled through the flange 24, the continued rotation of the first end 84A causes the threaded portion 94A to engage the newly drilled hole, and further rotation of the fastener member 82A is performed until the distal, second end 74A of the column member 70A is brought into contact with the flange 24. At this point, the first or headed end 84A of the fastener member 82A and the washer 90A (if provided) have been brought into pressing engagement with the top or first support surface 46A of the support spacer apparatus 40A. This result is effected by determining the dimensional proportions of the fastener assembly 100 such that the threaded portion 94A of the fastener member 82A retains threading engagement with the flange 24 when the second end 74A of the column member 70A comes into pressing engagement with the flange 24. Furthermore, the dimensional proportions of the fastener assembly 100 are established such that the distance 106 between the top surface of the flange 24 and the second support surface 48A of the support spacer apparatus 40A, once the fastener member 82A is adequately tightened to the flange 24, is approximately equal to, or somewhat greater than, the thickness of the insulation blanket 30. Of course, it will be recognized that the dimensional proportions of the fastener assemblies 40, 100 may be altered as desired to accommodate the insulation being installed.

OPERATION

The insulation of the pre-engineered building roof 10 utilizing the present invention will now be described beginning at the point in time during the construction of the building that the purlins 14 have been positioned and attached to the rafter members 20. Typically, the insulation blanket will be rolled over the purlins so that one or more widths of the blanket extend continuously from one side of the building to the other side of the building, with each of the widths of insulation passing over the apex of the building. Once in place, each of the widths of insulation blanket is cut to required length and weighted at each of its ends so as to tautly stretch each width of insulation over the rows of purlins. The installing workman, prior to the present invention, would then place roofing panels over the insulation and fasten the panels directly to the purlins in the manner described with reference to FIG. 2A. However, in the practice of the present invention, the installing workman, following placement of the insulation blanket 30 over the purlins 14, would then place a row of interconnected support spacer apparatuses 40 along each purlin in the following manner.

The installation of the roof 10 utilizing the present invention will be described with reference to the support spacer apparatus 40 which has been described with reference to FIGS. 3 through 5, and it will be understood that the description will apply as well to the support spacer apparatus 40A of FIG. 6. Each support spacer apparatus 40 will be pre-assembled prior to use with the roof 10; that is, each of the fastener apertures 50 of the support spacer apparatuses will have a fastener assembly 42 associated therewith in the assembled position as depicted in FIG. 5. The first support spacer apparatus 40 to be placed at the edge of the purlin 14 will be generally aligned with the longitudinal axis of the purlin to which it is to be attached and positioned with the drill bit ends 92 of all of its fastener assemblies 42 resting upon the top layer of the insulation 30, the top layer of the insulation 30 being, in most cases, a moisture impregnable vapor barrier which is normally a vinyl film reinforced with some type of fiber. By pressing the support spacer apparatus 40 toward the underlaying purlin 14, the drill bit ends 92 will easily penetrate the insulation and its vapor barrier, causing minimal disturbance to either the insulation or its vapor barrier. As the fastener assemblies 42 are pushed through the insulation 30, the drill bit ends 92 will come to rest on the flange 24 of the purlin 14.

The alignment of the longitudinal axis of the initially placed support spacer apparatus 40 can be achieved visually, or the proper alignment can be determined by the use of an aligning tool (not shown). This aligning tool is placed so as to abut with the end of a purlin, and it should provide an aligning tang protrusion, similar to the protruding tang 56 of the support spacer apparatus 40 shown in FIG. 4, which will be receivable within the channel portion of the second end 54 of the support spacer apparatus initially being positioned on the underlaying purlin 14. Of course, instead of an aligning tool being used to achieve the alignment of the initially positioned support spacer apparatus 40, an aligning tang protrusion can as well be provided by attaching or forming a guide member at one or both ends of each purlin 14, with the guide member having a protruding tang or the like, which serves to guide the placement of the initially positioned support spacer apparatus.

Whether the alignment of the first placed support spacer apparatus on each purlin is visually determined or is determined by reference to an aligning tang protrusion, it is anticipated that the longitudinal alignment of the initial support spacer apparatus 40 will be achieved somewhat simultaneously with pushing the fastener assemblies 42 through the insulation 30. Once the drill bit ends 92 are resting on the flange 24 of the underlaying purlin 14, the longitudinal alignment having been determined, the installer can effect attachment to the flange 24 by applying rotational energy to the fastener members 82 via an appropriate tool in rotating engagement with the headed first end 84 of each of the fastener assemblies 42.

After the initial support spacer apparatus has been attached to a particular purlin 14, the second support spacer apparatus 40 can be easily positioned by placing the channel of its second end 54 over the protruding tang 56 of the first end 52 of the already positioned support spacer apparatus 40. Once this interlocking step is accomplished, the fastener assemblies 42 of the second support spacer apparatus 40 are positioned to extend through the insulation 30 in the manner described for the first placed support spacer apparatus 40. With this completed, the fastener assemblies 42 of the second support spacer apparatus 40 can be tightened to securely attach it to the flange 24. Once attached to the flange 24, the second support spacer apparatus is ready to receive the next support spacer apparatus to be placed in line therewith. These steps are repeated until a row of aligned support spacer apparatuses 40 extend the combined distance of the widths of the insulation 30. In this way, the alignment of the first placed support spacer apparatus 40 serves to guide the placement of the succeeding support spacer apparatuses 40 along the length of the purlin 14. In line manner, a row of support spacer apparatuses 40 is provided for each of the purlins.

Once the support spacer apparatuses 40 are in place, it is a simple matter to position the roof panel member 16 onto the first support surfaces 46 of the installed and aligned support spacer apparatuses 40, and the roof panel members 16 can be attached to the support spacer apparatuses 40 via conventional screw members. In fact, it has been found that the installation of the panel members 16 is made much easier with the use of the support spacer apparatuses 40 constructed in accordance with the present invention. For one thing, the rows of axially aligned support spacer apparatuses 40 attached along the purlins serve as a solid insulation bridge and provides a solid footing for the panel members. Further, these aligned support spacer apparatuses provide the installer with a visual guide to aid in the placement of screw members through the panel members 16, providing him confidence that each screw member used to fasten the roof panel member 16 will be anchored to underlaying solid structural members, which in this case, will be the underlaying support spacer apparatuses 40.

As the fastener assemblies 42 are caused to penetrate the insulation 30, the pre-penetration integrity of the insulation is substantially maintained since the fastener assemblies 42 cause minimal disturbance to the insulation material. Rotational energy applied to the headed ends 84 of the fastener members 82 serve to vibrate the loose insulation fibers, causing the insulation to "fill out", and since the elongated fastener assemblies 42 are relatively small in relation to the supported areas of the support spacer apparatuses 40, the insulation is substantially unchanged from its prepenetration characteristics.

OTHER ALTERNATIVE FASTENER ASSEMBLIES

In addition to the above described fastener assemblies 40 and 100, several alternative fastener assemblies will now be described with reference to FIGS. 7 through 9. Since each of these fastener assemblies will be utilized with supoprt spacer apparatuses identical or similar to the support spacer apparatus 40 described above, it will be sufficient for the purpose of this disclosure to provide some examples of the types of fastener assemblies that, when used in combination with appropriately shaped spacer members, will achieve the objects of the present invention. Further, the alternative embodiments of the fastener assemblies of FIGS. 7–9 are not meant to be limiting, except in the general scope of normally recognized structural equivalency, to the scope of the present invention.

Figure 7:
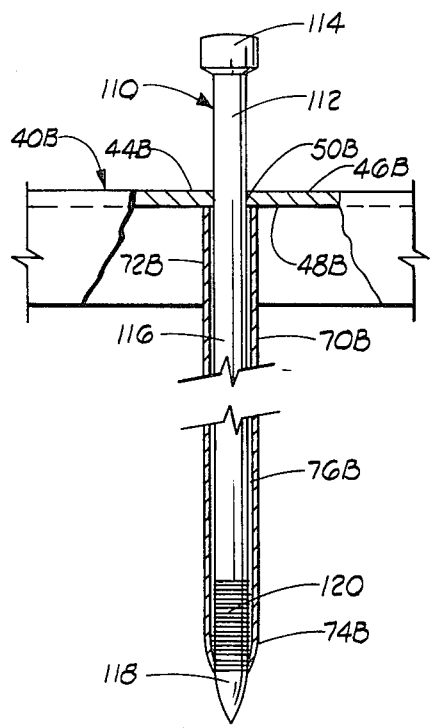
FIG. 7 is a side elevational, partial cutaway view of yet another fastener assembly constructed in accordance with the present invention.
Figure 8:
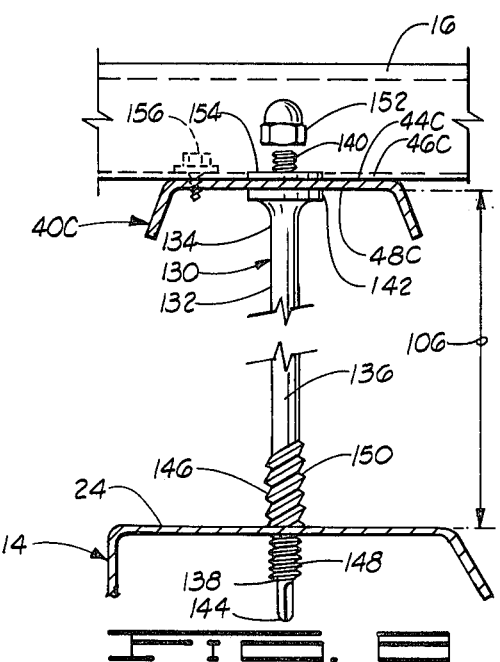
FIG. 8 is a side elevational, partial cutaway view of one other fastener assembly constructed in accordance with the present invention.

In FIG. 7, a support spacer apparatus 40B is shown which has a plurality of fastener apertures 50B, only one of which is shown in the partial view. A fastener assembly 110 is provided, the fastener assembly 110 comprising a column member 70B having a first end 72B, a second end 74B, and a channelway 76B extending from the first end 72B to the distal second end 74B. The fastener assembly 110 also comprises an elongated fastener member 112 which is generally in the form of an enlarged nail, with the fastener member 112 having a headed first end 114, a body portion 116 and a pointed second end 118. The first end 114 generally has a nail head configuration and may be provided with a washer (not shown). The second end 118 serves as a penetrating end for penetrating both the insulation 30 and the flanges 24 of the purlins 14, and the body portion 116 has a ridged portion 120 disposed in near proximity to the tapered or pointed end 118.

As depicted in FIG. 7, the fastener member 112 is disposed with its body portion 116 extending through the fastener aperture 50B and the channelway 76B. The tapered second end of the tube column 70B partially closes the channelway 76B sufficiently to receive the tapered second end 118 in a friction fit therewith, permitting the distal second end 118 to partially protrude from the end of the channelway 76B. This arrangement provides for the retention of the fastener member 112 in an assembled position with the tube column 70B in a ready profile for penetration of the insulation material 30 and for securement to the purlin 14.

In order to secure the column member 70B in the position depicted in FIG. 7 (that is, in its pre-penetration position), the tube column 70B can be attached to the second support surface 48B of the support spacer apparatus 40B, or alternatively, the fastener aperture 50B can be dimensioned to receive the body portion 116 of the fastener member 112 in a friction fit to retain the fastener member 112 in the position depicted, in which case there will be no need for attaching the tube column 70B to the spacer member 44B. Additionally, the tube column 70B can be provided with internal pressure points to assist in retaining the fastener member 112 in its assembled position.

The fastener member 112 may be driven into the flange 24 of a purlin 14 by the application of striking force applied to the first end 114; however, it is anticipated that the fastener member 112 can be motivated into a driving engagement with an underlaying purlin by the application of air pressure exerted by a conventional air driver. Once the fastener member 112 is caused to penetrate an underlaying purlin, the first end 114 will be positioned in pressing engagement with the first support surface 46B, the ridge portion 120 will come to rest in locked engagement with the hole provided by the penetration of the second end 118, and the ridge portion 120 will provide resistance to removal of the fastener member 112 from attaching engagement with the penetrated purlin. While the ridges of the ridge portion 120 are shown as circumferential ridges, it will be recognized that other ridge configurations can be utilized. Once the fastener member 112 is driven into the attached position with an underlying purlin, the tube column 70B will assume the same position as that described above for the tube column 70A depicted in FIG. 6.

Another embodiment of a fastener assembly usable in the present invention and designated by the numeral 130 is shown in FIG. 8 in an attached position with the spacer member 44C of the support spacer apparatus 40C and with the underlying purlin 14. The fastener assembly 130 features integral column and fastener member components, as the fastener assembly 130 comprises a fastener member 132 having a first end 134, a body portion 136 and a second end 138. The first end 134 has a threaded portion 140 that extends through a fastener aperture (not shown) in the spacer member 44C, the diameter of the fastener aperture being large enough to pass the threaded portion 140 but too small to receive the body portion 136. While the body portion of the fastener assembly 130 may serve as the stay member (the column member), a peripherally extensive shoulder portion 142 integrally formed with the body portion 136 may be provided to abut with the second support surface 48C of the spacer member 44C.

The second end 138 of the fastener assembly 130 is shaped in the configuration of a drill bit end 144, and the body portion 136 has a threaded portion 146 adjacent to the drill bit end 144. The threaded portion 146 has a first threaded part 148 and a second threaded part 150, the pitch of the threads of the first threaded part 148 being markedly different than the pitch of the threads of the second threaded part 150.

The cap nut 152 is provided and is threadingly receivable over the threaded portion 140. A washer 154 may be provided for placement on the threaded portion 140 between the cap nut 152 and the first support surface 46C of the spacer member 44C. The threaded bore of the cap nut 152 is dimensioned such that the extreme end of the threaded portion 140 will bottom out therein before the cap nut 152 is pressed into engagement with either the washer 154 or the first support surface 46C, if the washer 154 is not provided. This arrangement assures that the fastener member 132 is rotatable about its longitudinal axis in the fastener aperture of the spacer member 44C when the fastener assembly 130 is assembled thereto.

FIG. 8 shows the roof panel member 16 supported by the support spacer apparatus 40C and attached thereto by a sheet metal screw member 156. Also, the second end 138 of the fastener member 132 is shown attached to the flange 24 of the purlin 14 in the attached position of the fastener assembly 130.

The operation of the fastener assembly 130 of FIG. 8 is very similar to the operation described above for the other fastener assemblies 42, 100 and 110 in that the fastener assembly 130 serves to support the spacer member 44C at a predetermined distance 106 from the flange 24. Once assembled to the spacer member 44C and positioned to extend through insulation (not shown in FIG. 8), the drill bit end 144 is caused to drill a hole through the flange 24 by rotation of the fastener member 132 by the application of rotational energy to the cap nut 152. Of course, it will be recognized that the direction of all of the threads of the fastener assembly 130 must be coordinated such that tightening movement of the cap nut 152 on the threaded portion 140 will drive the other threads in a tightening direction toward the flange 24 and continued rotation of the fastener member 132 will cause the first threaded part 148 to engage the drilled hole. As the rotation continues, the threaded part 148 will move through the hole, having threaded same, and the second threaded part 150 will be caused to engage the threaded hole. Since the threads are pitched differently on the threaded part 150, the threaded part 150 will be jammed in the hole drilled by the drill bit end 144 and threaded by the threaded part 148. At this point, cross threading will create a large resistance to further rotation, and rotation of the cap nut 152 should be terminated. The dimensional proportions of the fastener assembly 130 are established such that the second support surface 48C will be spatially determined to be at the distance 106 above the flange 24 once all of the fastener assemblies 130 of the support spacer apparatus 40C are so secured.

Yet another embodiment of a fastener assembly for use in the present invention and designated by the numeral 160 is shown in FIG. 9 in an attached position with the spacer member 44D and the purlin 14. The fastener assembly 160 comprises an electrically conductive fastener member 162 which has a first end 164, a body portion 166 and a tapered second end 168. The first end 164 extends through the fastener aperture (not shown) of the spacer member 44D, and an insulator ring 170 is adhered to the first end 164, the insulator ring 170 being disposed to fill the fastener aperture while having oversized external ridge portions 172 and 174 extending from the fastener aperture to configure the insulator ring 170 in the general shape of grommet. However, the insulator ring 170 is also adhered to the spacer member 44D both within the fastener aperture and at the first and second support surfaces 44D, 46D by the overlapping of the external ridge portions 172 and 174. The insulator ring 170, which may be an epoxy material with suitable insulative qualities, serves to secure the fastener member 162 to the spacer member 44D, and it also serves as a stay member to exert upward force against the second support surface 48D in the attached position of the fastener assembly 160.

The operation of the fastener assembly 160 when assembled to the spacer member 44D is as follows. Once the support spacer apparatus 40D is positioned so as to extend the fastener assemblies 160 thereof through the insulation 30 (not shown in FIG. 9) so that the tapered second ends 168 contact the flange 24 of the underlaying purlin 14, each of the fastener assemblies 160 becomes an electrode and a weld bond 176 is formed between the second end 168 and the flange 24 by the application of electrical energy to the first end 164 which is extensive above the first support surface 46D. To accomplish the welding, a conventional welding apparatus can be utilized, and the fastener assemblies 160 of a support spacer apparatus 40D can be welded one at a time, or all at the same time by electrically interconnecting the extensive ends 164 of the fastener assemblies 160.

PRE-ENGINEERED BUILDING INSULATION SYSTEM OF FIGS. 10 AND 11

The support spacer apparatus of the present invention presents a system especially useful in the pre-engineered building industry in improving the insulative quality of roofing systems. In like manner, the present invention is also very useful in improving the insulative quality of wall systems, such as is shown in FIG. 10, which is a partially detailed, cutaway depiction of a pre-engineered building 200.

The pre-engineered building 200 comprises, in part, a plurality of primary structure members 202, a plurality of secondary structure members 204 and 206, a plurality of corrugated roof panel members 208 and a plurality of corrugated wall panel members 210. The primary structure members 202 comprises the vertically extending column members 212 and the generally horizontally extending rafter members 214 supported by the column members 212 and interconnecting with other rafter members (not shown) to form the primary structural system extending across to other vertically extending column members (not shown). The secondary structural members 204 are referred to as purlins and are the longitudinal members discussed in reference to FIGS. 1 through 9 hereinabove. The secondary structural members 206 are identical in construction to the purlins, but are supported by the vertically extending column members 212 and are referred to as "girts", only one of which is shown in FIG. 10.

The roof panel members 208 are attached to the support spacer apparatuses 40, described hereinabove and which extend through the roof insulation 216 and attach to the top flanges of the purlins 204. In like manner, the wall panel members 210 are attached to the support spacer apparatuses 40 which extend through the wall insulation 218 and attach to the outward flanges of the girts 206. This arrangement assures that the thickness of the roof insulation 216 and the thickness of the wall insulation 218 is not constricted by the attachment of the roof panel members 208 and the wall panel members 210, respectively, to the purlins 204 and to the girts 206.

In order to insure uniform thickness of the insulation throughout its length, a modification to prior art insulation methods is illustrated in FIG. 10. Typically, the ends of the insulation would simply be pinched down and permitted to extend out over the roof edges and out from the base of the wall panels. Instead of following that method, the ends of the insulation in the pre-engineered building 200 are treated in the following manner.

With reference to the roof insulation 216, the ends thereof will be designated as the first end 220 and as the second end 222. The first end 220, which is illustrated at the ridge purlin (the purlin at the uppermost point of the roof slope) where it is pinched down and secured to the top flange of the ridge purlin 204 by a plurality of screw members (not shown) which anchor an angle member 226 pressingly against the insulation 216 along the purlin 204. This arrangement leaves an insulation tail portion 228 which is reverse folded back over the body of the insulation 216 to fill the void created when the first end 220 is constricted or pinched down to secure it to the ridge purlin 204.

At the edge of the roof, an eave strut 230 is supported by the vertical column members 212 and extends the length of the roof. The second end 222 of the roof insultion 216, in like manner to that of the first end 220, is constricted and secured to the eave strut 230 via an angle member 232 and screw members (not shown). Again, this constriction and attachment of the second end 222 creates an insulation tail portion 236 which is folded back over the body of the insulation 216 to fill the void created when the second end 220 is constricted or pinched down to secure it to the eave strut 230.

The above described, novel method of securing and reverse folding of the ends of the roof insulation 216 serves to insure that the insulation is maintained taut between the ridge purlin 204 and the eave strut 230. (Or if the insulation is stretched over the full building width from eave strut to eave strut, as partially shown in FIG. 1, the insulation will be maintained taut from eave strut to eave strut.) Furthermore, this method maintains substantially full thickness at all points along the roof slope, even at the reverse folded and secured first and second ends 220 and 222, since the insultion tails 228 and 236 serve to substantially fill the voids at the constricted ends. Thus, a full insulation blanket is maintained along the length of the roof, and furthermore, the undersurface 238 of the insulation 216 maintains an attractive, even appearance within the interior of the pre-engineered building 200.

In like manner to that described for the insulation 216, the ends of the wall insulation 218 are similarly treated. The ends of the wall insulation will be referred to as the first end 240 and as the second end 242, which are disposed respectively near the base and the top of the wall panel members 210. The first end 240 of the wall insulation 218 is constricted or pinched down and secured to a base angle plate 244 which is supported by the outer edge of the foundation 245 of the pre-engineered building 200. The first end 240 is secured to the base angle plate 244 by an angle member 246 and a plurality of screw members (not shown) which anchor the angle member 246 along the base angle plate 244. It will be noted that the wall panel members 210 are also attached to the base angle plate 244. An insulation tail portion 250 is created by the securement of the first end 240 to the base angle plate 244, and this insulation tail portion 250 is reverse folded back over the body of the wall insulation 218 to fill the void created when the first end 240 is constricted or pinched down to secure it to the base angle plate 244.

In like manner, the end 242 is constricted and secured to the eave strut 230 via an angle member 252 and screw members (not shown) which extend through the angle member 252 and attach to the eave strut 230. Again, this constriction and attachment of the second end 242 creates an insulation tail portion 256 which is reverse folded back over the body of the wall insulation 218 to fill the void created when the second end 242 is constricted or pinched down to secure it to the eave strut 230. In typical construction of a pre-engineered building, a flash member 260 is secured via the screw members 262 to the eave strut 230, and the flash member 260 is shaped to extend downwardly to fill the gap between the top of the wall panel members 210 and the roof panel members 208. The bottom end 264 of the flash member 260 is notched to match the corrugations of the wall panel members 210, and is secured to the upper portions of the wall panel members 210 via the screw members 266. It will be noted that the insulation tail 256 is selectively sized to be able to shape the wall insulation 218 to fill the complete space between the flash member 260 and the eave strut 230, as well as to compensate for the constriction or pinching down of the second end 242.

As with the roof insulation 216, this novel method of securing and reverse folding of the ends of the wall insulation 218 serves to insure that the insulation is maintained taut between the eave strut 230 and the base angle plate 244, which means that the wall insulation 218 will be maintained taut throughout its length. Furthermore, this method also maintains substantial full thickness at all points along the complete length of the wall panels 210, even at the reverse folded and secured first and second ends 240 and 242, since the insulation tails 250 and 256 serve to fill all voids at the constricted ends.

Thus, a full insulation blanket is maintained along the height of the wall panels 210, and the interior surface 258 of the wall insulation 218 maintains an attractive, wrinkle free appearance within the interior of the pre-engineered building 200.

An alternative method of securing the ends of the insulation while maintaining full thickness of the insulation throughout its length is illustrated in FIG. 11. In FIG. 11 the first end 240A is cut square and fitted into a base channel 270 which is preferably made of a low thermal conductivity material and which is supported by the concrete foundation 272 of the pre-engineered building 200.

Preferably, the foundation 272 of the pre-engineered building 200 is laid over a slab insulator layer 274 which in turn is laid over a slab vapor barrier 276. Typically, the slab insulator 274 would be a styrofoam material and the slab vapor barrier 276 would be a sheet of vinyl material. The outer edge of the foundation 272 is preferably covered by a layer of insulation 278, which may also be styrofoam material. The base channel 270 is disposed to extend from the foundation 272 near the top of the insulation layer 278 and attached by a plurality of fasteners 280, which may comprise tubular anchors embedded at the external edge of the foundation 272, and corresponding screw members which are extensive through appropriately located apertures in the base channel 270 and which threadingly engage the tubular anchors.

The vinyl slab vapor barrier 276 may be caused to extend along the outer surface of the insulation layer 278, between the base channel 270 and the foundation 272, and lapped back over into and lining the inside surface of the base channel 270. The slab vapor barrier 276 can be secured in this disposition by appropriate application of a conventional adhesive, and once in place, the squared first end 240A of the wall insulation 218 is secured within the base channel 270 via a conventional adhesive or by attachment means (not shown). This arrangement provides a continuous vapor barrier from the bottom of the wall insulation 218 to beneath the foundation 272. Alternatively, the slab vapor barrier 276 may be terminated along the line 282 at the base channel 270; once the squared first end 240A is secured within the base channel 270, this arrangement should also provide an adequate continuous vapor barrier.

It will be noted that the wall panel members 210 are attached to the outer flange 286 of the base channel 270 along the base of the wall panels 210. In such a case, the open corrugations of the wall panel members 210 should be plugged with panel closure members 288, which may be appropriately sized foam plugs, in order to prevent upward drafts and moisture invasion in the internal hollows formed by the corrugations of the wall panel members 210.

While the squaring of the insulation ends has been discussed only with reference to the first end 240A of the wall insulation 218, as shown in FIG. 11, it will be appreciated that this same technique can be practiced to square and secure the second end 242 of the wall insulation 218, as well as the first and second ends 220 and 222 of the roof insulation 216.

The above described, novel method of securing the ends of the wall insulation 216 and the roof insulation 218, illustrated with respect to the first end 240A shown in FIG. 11, serves to provide the same benefit discussed above for the securing and reverse folding system discussed with reference to FIG. 10. That is, full thickness of the insulation is maintained along the entire length of both the roof insulation 216 and the wall insulation 218, improving the thermal effectiveness of the insulation and presenting an attractive, even appearance of the interior surfaces 238 and 258 within the pre-engineered building.

It is clear that the present invention is well adapted to carry out the objects and to attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. A support spacer apparatus supportable by a substrate in a predetermined spatial relationship thereto, the spacer apparatus comprising:
 a spacer member having a first support surface and an opposite second support surface, the spacer member having a plurality of fastener apertures communicating therethrough; and
 fastener means for attaching the spacer member to the substrate, the fastener means characterized as comprising:
   a plurality of discrete column members secured to the spacer member before installation of the apparatus, the column members extending from the second support surface of the spacer member, each column member having a channelway communicating with one of the fastener apertures and extending to the distal end of the column member, each column member maintainable substantially in nonpenetrating engagement with the substrate in the installed position of the apparatus; and
   a plurality of fastener members extendable through the fastener apertures, each fastener member extendable through the channelway of one of the column members and attachable to the substrate so that the first support surface is disposed a predetermined distance from the substrate in an attached position of the support spacer apparatus to the substrate.

2. The support spacer apparatus of claim 1 wherein each of the column members is shaped to penetrate a compressible material so that the characteristics of the compressible material are substantially retained during the penetration of the column members.

3. The support spacer apparatus of claim 1 wherein the column members and the fastener members are shaped to cooperatively penetrate a compressible material so that the characteristics of the compressible material are substantially retained during the penetration of the combined column members and fastener members.

4. The support spacer apparatus of claim 1 wherein the fastener means is shaped to penetrate a compressible material so that the characteristics of the compressible material are substantially retained during the penetration of the fastener means.

5. The support spacer apparatus of claim 1, 2, 3 or 4 wherein each fastener member is attachable to the substrate, at any substrate location overlain by its corresponding fastener aperture in the spacer member, by the application of energy to one end of the fastener member to cause attachment of the other end of the fastener member to the substrate.

6. The support spacer apparatus of claim 5 wherein the energy applied to the end of the fastener members assists in penetrating and substantially retaining the prepenetration characteristics of the compressible material.

7. The support spacer apparatus of claim 6 wherein each of the fastener members comprises an elongated member having a first end, a second end and a body portion disposed therebetween, the second end and the body portion passable through a selected one of the fastener apertures and the channelway of a respectively associated column member, the second end rigidly attachable to the substrate by application of energy delivered to the first end which is disposed adjacent to the first support surface in an attached position thereof.

8. The support spacer apparatus of claim 5 wherein each of the column members is a tube column having a channelway extending from an attachment end thereof to a tapered distal end thereof.

9. The support spacer apparatus of claim 8 wherein each of the fastener members comprises an elongated member having a first end, a second end and a body portion disposed therebetween, the second end and the body portion passable through a selected one of the fastener apertures and the channelway of a respectively associated column member, the second end rigidly attachable to the substrate by application of energy delivered to the first end which is disposed adjacent to the first support surface in an attached position thereof.

10. The support spacer apparatus of claim 5 wherein each of the fastener members comprises an elongated member having a first end, a second end and a body portion disposed therebetween, the second end and the body portion passable through a selected one of the fastener apertures and the channelway of a respectively associated column member, the second end rigidly attachable to the substrate by application of energy delivered to the first end which is disposed adjacent to the first support surface in an attached position thereof.

11. The support spacer apparatus of claim 10 wherein each of the fastener members comprises a screw member, the second end being a self-drilling/self-tapping screw.

12. The support spacer apparatus of claim 10 wherein each of the fastener members comprises a screw member, the second end being a self-drilling/self-tapping screw and the first end having a bolthead configuration, the screw member being of a length determined to effect compressive force upon its respective tube column member when the screw member is disposed through one of the fastener apertures and caused to be attached to the substrate.

13. The support spacer apparatus of claim 12 wherein each of the fastener apertures is tubulated and each of the column members is connected to the tubulation of its respective fastener aperture.

14. The support spacer apparatus of claim 12 wherein each of the tube columns is weldingly attached to the second support surface so that its respective channelway is substantially axially aligned with the respective fastener aperture.

15. The support spacer apparatus of claim 10 wherein each of the fastener members comprises a screw member, the second end being configured as a drill bit, the body portion having screw threads disposed in near proximity to the second end, and the first end having a bolthead configuration, the screw member being of a length determined to effect compressive force upon its respective tube column member when the screw member is disposed to extend through one of the fastener apertures and caused to be attached to the substrate.

16. The support spacer apparatus of claim 15 wherein each of the fastener apertures is tubulated and each of the column members is connected to the tubulation of its respective fastener aperture.

17. The support spacer apparatus of claim 15 wherein each of the tube columns is weldingly attached to the second support surface so that its respective channelway is substantially axially aligned with the respective fastener aperture.

18. The support spacer apparatus of claim 10 wherein each of the fastener members comprises a nail member, the second end tapered to a penetrating point and the first end substantially having a nailhead configuration, the nail member being of a length determined to restrain its respective tube column member when the nail member is disposed to extend through one of fastener apertures and caused to be penetratingly attached to the substrate by energy applied to the first end thereof.

19. The support spacer apparatus of claim 18 wherein each of the nail members is dimensioned to be received in the channelway of its respective column member by a friction fit so that the tapered second end extends from the channelway in an assembled position in which the nail member is disposed to extend through one of the fastener apertures and through its respective tube column member so as to support the tube column member in a ready position prior to the nail member being caused to be penetratingly attached to the substrate.

20. The support spacer apparatus of claim 19 wherein each of the fastener apertures is tubulated and each of the column members is connected to the tubulation of its respective fastener aperture.

21. The support spacer apparatus of claim 19 wherein each of the tube columns is weldingly attached to the second support surface so that its respective channelway is substantially axially aligned with the respective fastener aperture.

22. The support spacer apparatus of claim 18 wherein each of the fastener apertures is tubulated and each of the column members is connected to the tubulation of its respective fastener aperture.

23. The support spacer apparatus of claim 18 wherein each of the tube columns is weldingly attached to the second support surface so that its respective channelway is substantially axially aligned with the respective fastener aperture.

24. The support spacer apparatus of claim 10 wherein each of the fastener apertures is tubulated and each of the column members is connected to the tubulation of its respective fastener aperture.

25. The support spacer apparatus of claim 10 wherein each of the tube columns is weldingly attached to the second support surface so that its respective channelway is substantially axially aligned with the respective fastener aperture.

26. The support spacer apparatus of claim 5 wherein each of the fastener members comprises a screw member, the second end being a self-drilling/self-tapping screw.

27. The support spacer apparatus of claim 1 wherein each of the column members is attached at an attachment end thereof to the spacer member and extensive from the second support surface.

28. The support spacer apparatus of claim 27 wherein each of the fastener members comprises an elongated member having a first end, a second end and a body portion disposed therebetween, the second end and the body portion passable through a selected one of the fastener apertures and the channelway of a respectively associated column member, the second end rigidly attachable to the substrate by application of energy delivered to the first end which is disposed adjacent to the first support surface in an attached position thereof.

29. The support spacer apparatus of claim 1, 2, 3, 4, 27, 28, 22 or 23 further comprising at least one panel member, the panel member being supportable by the first support surfaces of a plurality of the spacer members, and attachment means for attaching the panel member to the spacer member.

30. The support spacer apparatus of claim 28 wherein each of the fastener apertures is tubulated and each of the column members is connected to the tubulation of its respective fastener aperture.

31. The support spacer apparatus of claim 27 wherein each of the tube columns is weldingly attached to the second support surface so that its respective channelway is substantially axially aligned with the respective fastener aperture.

32. The support spacer apparatus of claim 1 wherein the spacer member is a channel member having a first end and a second end, a portion of the first end being shaped to be receivable by the second end of another panel support spacer apparatus disposed in end-to-end alignment with the spacer member.

33. A support spacer apparatus supportable by a substrate in a predetermined spatial relationship thereto, the spacer apparatus comprising:
a spacer member having a first support surface and an opposite second support surface, the spacer member having a plurality of fastener apertures communicating therethrough; and
fastener means for attaching the spacer member to the substrate, the fastener means comprising:
a plurality of discrete column members connected to the spacer member before installation of the apparatus and extensive from the second support surface, each column member maintainable substantially in nonpenetrating engagement with the substrate in the installed position of the apparatus; and
a plurality of fastener members extendable through the fastener apertures and attachable to the substrate so that the column members are disposed between the spacer member and the substrate, the first support surface being thereby disposed a predetermined distance from the substrate, each fastener member attachable to the
substrate, at any substrate location by its corresponding fastener aperture in the spacer member, by the application of energy to one end of the fastener member to cause attachment of the other end of the fastener member to the substrate.

34. The support spacer apparatus of claim 33 wherein the column members are shaped to penetrate a compressible material so that the characteristics of the compressible material are substantially retained during the penetration of the column members.

35. The support spacer apparatus of claim 34 wherein each of the column members is a tube column having a channelway extending from an attachment end thereof to a tapered distal end thereof, and wherein each fastener member is disposed to extend through the channelway of a respective tube column, each of the tube columns attached at its attachment end to the spacer member.

36. The support spacer apparatus of claim 35 wherein each of the fastener members comprises a screw member having a first end and a second end, and the first end having a bolthead configuration, the second end being a self-drilling/self-tapping screw, the screw member being of a length determined to effect compressive force upon its respective tube column member when the screw member is disposed through one of the fastener apertures and caused to be attached to the substrate.

37. The support spacer apparatus of claim 35 wherein each of the fastener members comprises a screw member having a first end, a second end and a body portion, the first end having a bolthead configuration, the second end being configured as a drill bit, and the body portion having screw threads disposed in near proximity to the second end, the screw member being of a length determined to effect compressive force upon its respective tube column member when the screw member is disposed to extend through one of the fastener apertures and caused to be attached to the substrate.

38. The support spacer apparatus of claim 35 wherein each of the fastener members comprises a nail member having a first end and a second end, the first end substantially having a nailhead configuration, and the second end tapered to a penetrating point, the nail member being of a length determined to restrain its respective tube column member when the nail member is disposed to extend through one of the fastener apertures and caused to be penetratingly attached to the substrate by energy applied to the first end thereof.

39. The support spacer apparatus of claim 38 wherein each of the nail members is dimensioned to be received in the channelway of its respective tube column member by a friction fit so that the tube column member is supported by the nail member and extensive from the second support surface prior to the nail member being caused to be penetratingly attached to the substrate.

40. The support spacer apparatus of claim 33, 34, 35, 36, 37, 38 or 39 wherein each of the fastener apertures is tubulated and each of the column members is connected to the tubulation of its respective fastener aperture.

41. The support spacer apparatus of claim 33, 34, 35, 36, 37, 38 or 39 wherein each of the column members is weldingly attached to the second support surface so that its respective channelway is substantially axially aligned with the respective fastener aperture.

42. The support spacer apparatus of claim 33, 34, 35, 36, 37, 38 or 39 wherein the spacer member is a channel member having a first end and a second end, a portion of the first end being shaped to be receivable by the second end of another support spacer apparatus disposed in end-to-end alignment with the spacer member.

43. The support spacer apparatus of claim 33, 34, 35, 36, 37, 38 or 39 further comprising at least one panel member partially supportable by the first support surface of the spacer member, and attachment means for attaching the panel member to the spacer member.

* * * * *

UNITED STATES PATENT AND TRADEMARK OFFICE
CERTIFICATE OF CORRECTION

PATENT NO. :  4,329,823
DATED      :  May 18, 1982
INVENTOR(S) : Harold G. Simpson It is certified that error appears in the above-identified patent and that said Letters Patent is hereby corrected as shown below:

In column 7, line 47, the word "dispose" should read --disposed--. In column 9, line 6, the numeral "50" should read --50A--; column 9, line 7, the numeral "50A" should read --50--. In column 11, line 22, the word "line" should read --like--; column 11, line 56, the word "prepenetration" should read --pre-penetration--; column 11, line 64, the word "supoprt" should read --support--. In column 15, lines 53 and 54, the word "insultion" should read --insulation--. In column 16, line 4, the word "insultion" should read --insulation--. In column 21, line 15, the numeral "28" should read --27--; column 21, line 53, the word "substrate" should appear as a continuation of the subparagraph and not as the first word of a new subparagraph.

Signed and Sealed this

Thirtieth Day of November 1982

[SEAL]

Attest:

GERALD J. MOSSINGHOFF

Attesting Officer    Commissioner of Patents and Trademarks